United States Patent Office 3,127,103
Patented Mar. 31, 1964

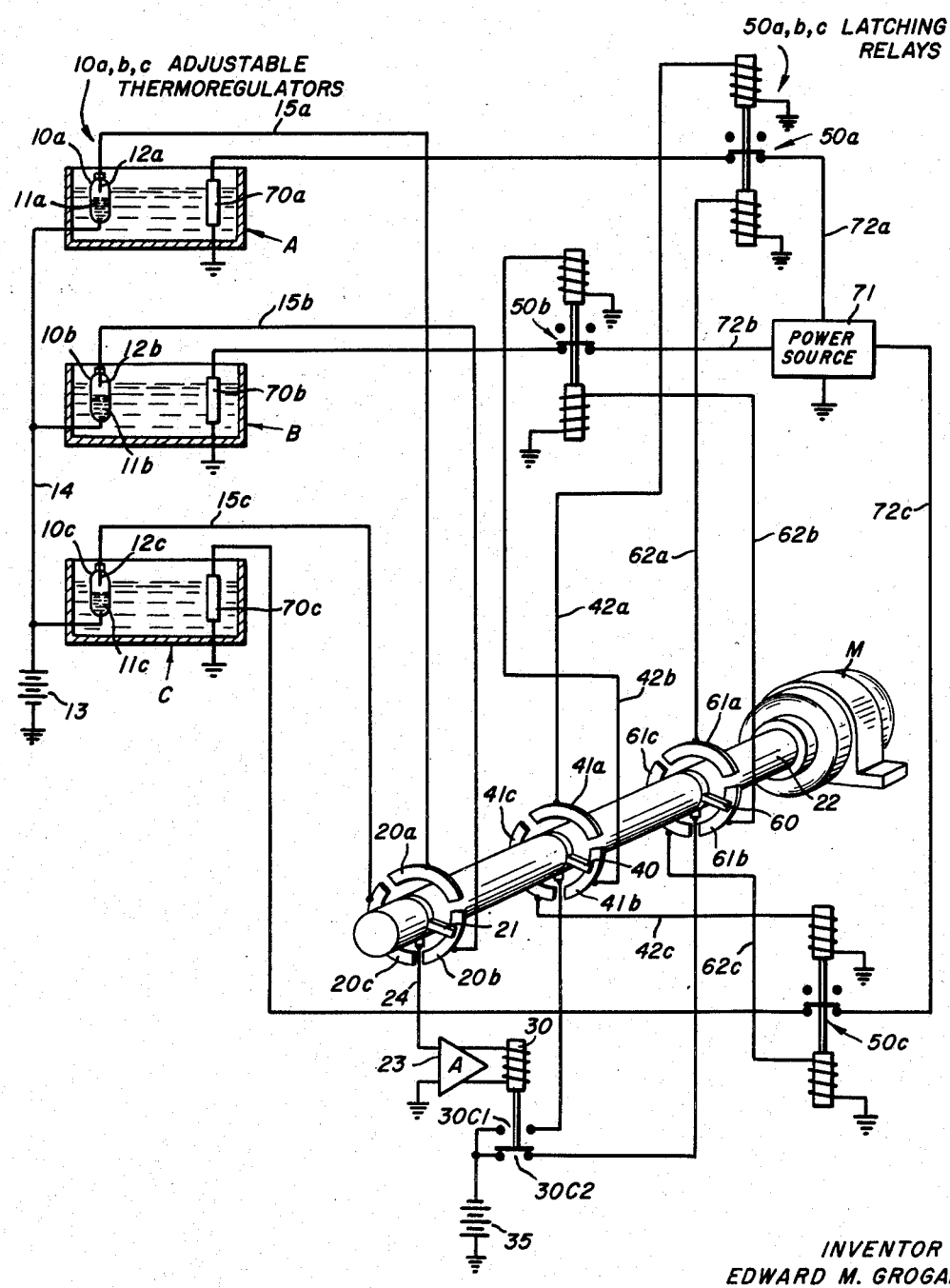

3,127,103
CONTINUOUS SWITCHING FOR CONTROL SYSTEMS
Edward M. Grogan, Pittsburgh, Pa., assignor to United States Steel Corporation, a corporation of New Jersey
Filed Sept. 27, 1961, Ser. No. 141,170
2 Claims. (Cl. 236—1)

This invention relates to system control devices and, more particularly, to a control device for regulating the temperature of a plurality of systems independently.

Frequently it is desired to maintain several systems, e.g., solutions or baths for reactions, at a given temperature. Particularly in a laboratory or a pilot type operation there are often several baths that must be maintained, each at its own temperature. Conventionally, the temperature is measured by thermoregulators which are capable of carrying a very low order of magnitude of current. The current carried by the regulators must be amplified in order to perform the switching necessary for the regulation of the bath temperature. Heretofore, this has required separate amplification of the current delivered from each regulator to control the bath temperatures. This has meant separate amplification equipment which is expensive and often bulky.

It is therefore a principal object of this invention to provide a control device which will control the condition of a plurality of systems.

A more particular object of this invention is to provide a control device which will control the temperatures of a plurality of systems.

Another more specialized object of this invention is to provide a device which will selectably sense and control the temperatures of a plurality of systems.

Other objects and advantages of the invention will become apparent from the following description and accompanying drawing, in which:

The single figure is a schematic diagram of a control device for the control of a plurality of system temperatures.

Referring now to the drawing, three baths whose temperatures are to be controlled are designated generally as A, B and C. It will become apparent in the following description that any reasonable number of baths can be controlled; however, the description for simplicity will be limited to but three systems. For further clarity of description those parts of the control device which are directly associated with one of the particular baths will be designated by numbers having letter suffixes corresponding to the respective bath with which it is associated.

The control device includes a plurality of conventional thermoregulators 10a, 10b, and 10c. Thermoregulator 10a includes a mercury column 11a and an adjustable wire 12a which is positionable to contact the mercury column at a selectable temperature. The regulators 10b and 10c are similarly constructed. A source of potential 13 is provided which is connected through a conductor 14 to each of the mercury columns. The wires 12a, 12b, and 12c are connected to conductors 15a, 15b, 15c respectively which are adapted to deliver a current when the mercury column in the respective regulator contacts its wire. Each of the wires 12a, 12b, and 12c are adjustable so that the mercury will contact its associated wire at a desired temperature and will allow current to flow through the thermoregulator at that temperature.

The conductors 15a, 15b, and 15c are connected to contact points 20a, 20b, and 20c respectively. A signal receiving arm 21 is mounted for rotation on a shaft 22, which shaft is rotatably driven by motor M and is positioned to sequentially contact the contact points 20a, 20b, and 20c. The arm 21 is connected to an amplifier 23 by a conductor 24. Thus, if the mercury column 11a is in contact with the wire 12a when the arm 21 is contacting the contact point 20a a signal will be delivered from the arm 21 to the amplifier 23. Similarly, a signal will be delivered to the amplifier when mercury column 11b contacts the wire 12b and the arm 21 contacts the contact point 20b, or when the mercury column 11c contacts the wire 12c and the arm 21 contacts the contact point 20c. If, on the other hand, the mercury column 11a is not contacting the wire 12a no signal will be delivered to the contact point 20a and when the arm 21 is in contact with the contact point 20a, no signal will be received by the arm. Similarly, the arm receives no signal when it contacts the contact point 20b if the mercury column 11b is not in contact with the wire 12b and no signal will be received by the arm 21 when it contacts the contact point 20c if the mercury column 11c is not contacting the wire 12c.

The amplifier 23 is connected to a relay coil 30 which has normally open contact 30c1 and normally closed contact 30c2. A battery 35 is connected through contact 30c1 to a signal receiving arm 40 which is mounted on the shaft 22 and rotatable therewith. A second set of contact points 41a, 41b, and 41c is provided and arranged so that as the signal receiving arm 40 rotates with the shaft it sequentially contacts the points 41a, 41b, and 41c in the same relationship that the arm 21 contacts the points 20a, 20b, and 20c. The contact points 41a, 41b, and 41c are connected to latching relays 50a, 50b, and 50c by conductors 42a, 42b, and 42c. The latching relays are conventional and a suitable relay is Model No. LE2C115VA sold by Advance Electric and Relay Company. The function of the relays will be described presently.

The battery 35 is connected through contact 30c2 to a third signal receiving arm 60 which is mounted on the shaft 22 and rotatable therewith. A third set of contact points 61a, 61b, and 61c are arranged around the shaft 22 and positioned to contact the arm 60 sequentially as the arm 60 rotates. These contact points 61a, 61b, and 61c are also arranged such that the arm 60 contacts the points 61a, 61b, and 61c in the same relationship that the arms 21 and 40 contact their respective contact points. The contact points 61a, 61b, and 61c are connected to latching relays 50a, 50b, and 50c respectively by conductors 62a, 62b, and 62c.

Each of the latching relays 50a, 50b, and 50c has an open position and a closed position. The relays 50 are connected to the contact points 41 and 61 such that current from a contact point 41 will cause its respective relay to open, and current from a contact point 61 will cause its respective relay to close. In the closed position current can flow through the relay but in the open position current is prevented from flowing through the relay. The relays 50 are latching relays, and hence once in the open position each will remain in the open position until closed by current from its respective contact point 61 and once in the closed position will remain closed until opened by current from its respective contact point 41. The relays 50a, 50b, and 50c are connected to heaters 70a, 70b, and 70c respectively which in the disclosed embodiment take the form of resistance-type immersion heaters. A source of electrical energy 71 is provided which is connected to the relays 50a, 50b, and 50c by the conductors 72a, 72b, and 72c, which will energize a heater when its respective relay is closed.

Operation

Each of the thermoregulators 10a, 10b and 10c is adjusted so that when its respective bath reaches a selected temperature the mercury column will touch the wire. The temperature of each bath can be independently selected and does not have to be the same as the temperature of any other bath. The thermoregulators are immersed in the bath and the mercury column will rise to the level indicated by the temperature of the bath. The motor M is started and the arms 21, 40 and 60 rotate with the shaft 22. When the arm 21 contacts the point 20a and the temperature of bath A is below the selected value the mercury column 11a will not be touching the wire 12a and hence, no current can flow through the regulator so that no current will be delivered to the amplifier 23. Thus, current will flow from the battery 35 through contact 30c2, arm 60, contact point 61a, and lead 62a to latching relay 50a and will cause the relay to move to or remain in the closed position as the case may be. With the latching relay in the closed position, current will flow from the current source 71 through the relay 50a to the heater 70a which will cause the bath to be heated. As the shaft 22 continues to rotate the arm 21 moves out of contact with the contact point 20a, but the latching relay 50a will remain in its closed position and current will continue to flow.

Next, the arm 21 will come in contact with contact point 20b. If the bath B has not reached the selected temperature the heater will be actuated as described above. However, if the bath B has reached the selected temperature the mercury column 71b will have risen and contacted the wire 12b. This will cause a current to flow from the battery 13 through the thermoregulator 10b to the contact point 20b, thus energizing relay coil 30 to close its contact 30c1. Current will then flow from the battery 35 through contact 30c1, arm 40 and contact point 41b to the latching relay 50b, and cause it to move to or remain in its open position as the case may be. Hence, no current can flow from the power source 71 through the relay 50b so the heater 70b will not be actuated.

The rotation of the shaft 22 continues and the arm 21 then comes into contact with contact point 20c. As described above, if the temperature in the bath C is below the selected value the latching relay 50c will be moved to or remain in the closed position and current will flow to the heater; but if the bath C has reached the selected temperature the relay 50c will be moved to or remain in its open position and no current will flow to the heater 70c. The rotation of the arms continues, regulating the temperature of each bath once during each revolution.

While one embodiment of my invention has been shown and described it will be apparent that other adaptations and modifications may be made without departing from the scope of the following claims.

I claim:
1. A system-condition control device for regulating a plurality of systems independently, comprising:
 (a) independently operating system-condition signaling means, for each system under regulation, comprising individually adjustable system-condition sensing means for each system, on-off switch means responsively associated with said sensing means, and a source of signal current in circuit with said on-off switch means;
 (b) one amplifier for the several signal currents;
 (c) a first multiple contact switch capable of sequentially connecting each signaling means with said amplifier;
 (d) individual, two position latching relays for on-off control of system-condition altering means for each system under regulation;
 (e) a source of current for energizing coils of said latching relays;
 (f) a relay with coil responsive to current from said signal current amplifier, said relay having in circuit with said latching relay energizing current a normally open set of contacts, which close in response to receipt of an amplified signal, and a normally closed set of contacts;
 (g) a second multiple contact switch capable of sequentially connecting latching relay energizing current flowing through the said normally open set of contacts, when closed, to said individual latching relays to energize coils corresponding to appropriate contact positions thereof and a third multiple contact switch capable of sequentially connecting latching relay energizing current, flowing through the said normally closed set of contacts, to said individual latching relay to energize coils corresponding to opposite contact positions thereof, said first, second, and third multiple contact switches being adapted to maintain corresponding sequence relationship to individual systems under regulation.

2. A system-temperature control device for regulating a plurality of systems independently, comprising:
 (a) independently operating system-temperature signaling means, for each system under regulation, comprising individually adjustable thermoregulators for each system, each thermoregulator comprising a mercury column and a conductor for making contact therewith at selected temperature, and a source of signal current in circuit with said mercury and conductor;
 (b) one amplifier for the several signal currents;
 (c) a first multiple contact switch capable of sequentially connecting each signaling means with said amplifier;
 (d) individual, two position latching relays for on-off control of system-temperature altering means for each system under regulation;
 (e) a source of current for energizing coils of said latching relays;
 (f) a relay with coil responsive to current from said signal current amplifier, said relay having in circuit with said latching relay energizing current a normally open set of contacts, which close in response to receipt of an amplified signal, and a normally closed set of contacts;
 (g) a second multiple contact switch capable of sequentially connecting latching relay energizing current flowing through the said normally open set of contacts, when closed, to said individual latching relays to energize coils corresponding to appropriate contact positions thereof and a third multiple contact switch capable of sequentially connecting latching relay energizing current, flowing through the said normally closed set of contacts, to said individual latching relays to energize coils corresponding to opposite contact positions thereof, said first, second, and third multiple contact switches being adapted to maintain corresponding sequence relationship to individual systems under regulation.

References Cited in the file of this patent
UNITED STATES PATENTS

| | | |
|---|---|---|
| 1,925,463 | Schmidt | Sept. 5, 1933 |
| 2,436,720 | Jones | Feb. 24, 1948 |
| 2,770,420 | Potter et al. | Nov. 14, 1956 |
| 2,887,271 | Akin et al. | May 19, 1959 |

FOREIGN PATENTS

| | | |
|---|---|---|
| 710,311 | Germany | Sept. 10, 1941 |
| 1,004,707 | Germany | Mar. 21, 1957 |